May 21, 1957 R. H. NIBLOCK, SR 2,793,248

PORTABLE INTERCOMMUNICATION TELEPHONE

Filed Sept. 14, 1953 2 Sheets-Sheet 1

INVENTOR.
RAYMOND H. NIBLOCK, SR.
BY Zoltan Holockely
ATTORNEY

May 21, 1957 R. H. NIBLOCK, SR 2,793,248

PORTABLE INTERCOMMUNICATION TELEPHONE

Filed Sept. 14, 1953 2 Sheets-Sheet 2

INVENTOR.
RAYMOND H. NIBLOCK, SR.

BY Zoltan H. Polachek

ATTORNEY

United States Patent Office 2,793,248

Patented May 21, 1957

2,793,248

PORTABLE INTERCOMMUNICATION TELEPHONE

Raymond H. Niblock, Sr., Winston-Salem, N. C.

Application September 14, 1953, Serial No. 379,847

8 Claims. (Cl. 179—1)

The present invention relates to a portable telephone communication assembly and, more particularly, to a portable telephone set including two handsets which are interconnected by means of a reel-mounted cable, whereby the cable connection between handsets may be extended to accommodate a wide range of distances therebetween.

In establishing temporary field telephone connections between two points, the need exists for a simple and relatively inexpensive intercommunication apparatus wherein the length of the cable is readily adjustable to the specific distance requirements. For example, in the installation of television antennas on the roofs of a building and homes, the radio serviceman stationed on the roof usually finds it necessary to communicate with his assistant in the building in order to determine how adjustments in the antenna affect the picture reception on the screen of the television receiver. Since, in practice, the installation may in one instance involve a ten-story building with the television set located at the lowest flight therein and, in another instance, a two-story home with the set located at the upper floor, the conventional field telephone set intended for this purpose may have a cable of inadequate length in the first instance and of excessive length in the second instance. Electricians when wiring or checking wiring in buildings, ships, elevators, etc., also require an intercommunication system and are faced with the same problem as the television serviceman.

Similarly, in the installation of temporary or permanent private intercommunication systems in offices or factories, a cable of sufficient length in a given situation may prove to fall short when the system is shifted to another point.

Accordingly, the principal object of the present invention is to provide a two-station portable telephone assembly including a cable of adjustable length. An assembly, in accordance with the invention, may be utilized as a permanent or private communication system between offices, conference rooms, hotel rooms and the like.

More specifically, it is an object of the invention to provide a two-station portable intercommunication system wherein the connecting cable is wound about a rotatable reel and wherein the cable may be played out to a desired length without interrupting the electrical connection between stations.

Still another object of the invention is to provide a two-station intercommunication system which is of high sensitivity and reliable in operation, wherein the system may be activated at either station. In an arrangement according to the invention, when the system is not in use, it is not possible to leave any circuit in a closed position. Hence, an unintentional drain on the voltage source is avoided.

A further object of the invention is to provide a two-station portable intercommunication system of rugged, inexpensive design which may be manufactured and sold at reasonable cost.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Figures 1, 2:
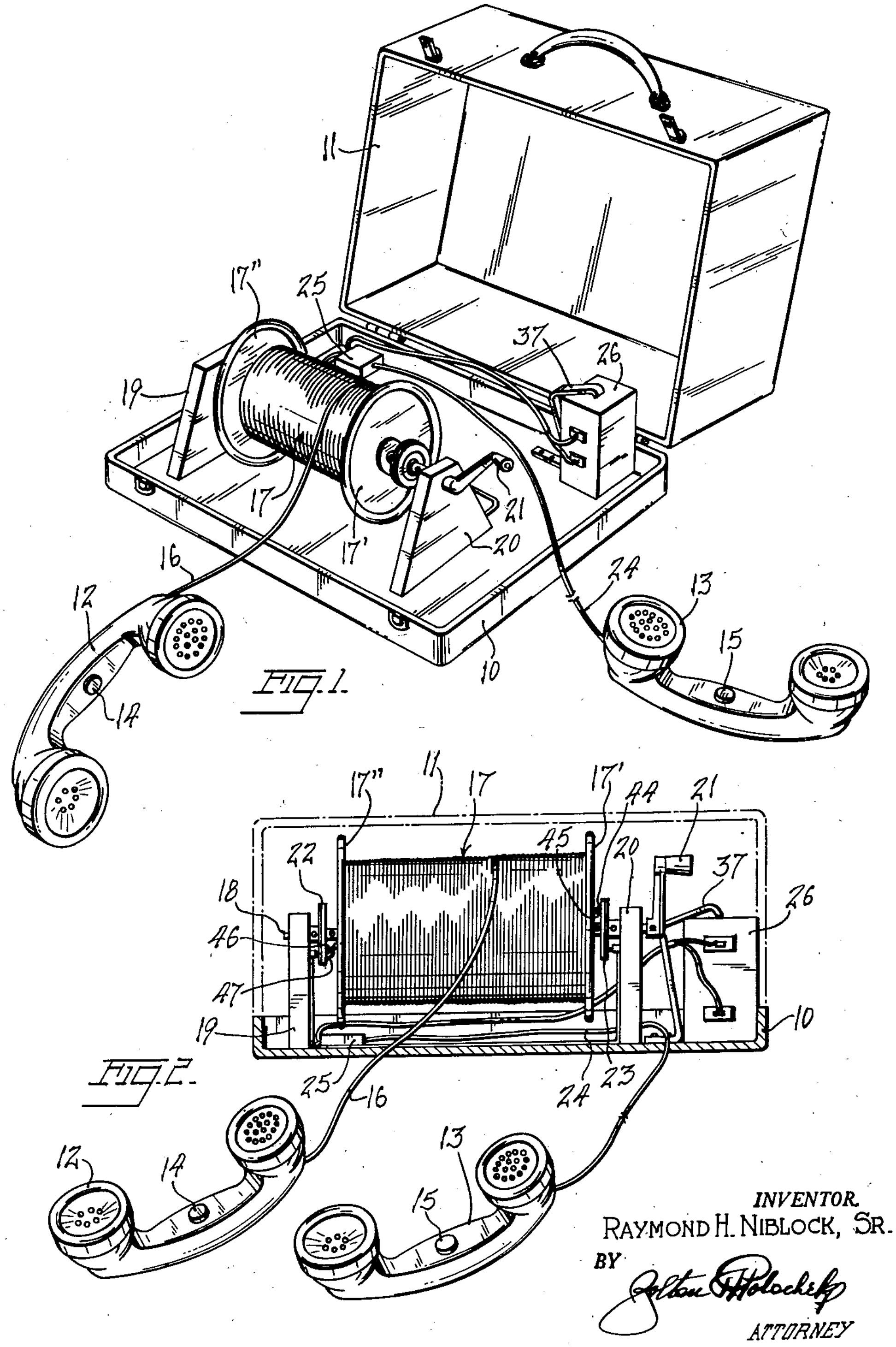
Fig. 1 is a perspective view of a portable two-station intercommunication apparatus in accordance with the invention.
Fig. 2 is a front elevational view of the intercommunication apparatus.

Referring now to the drawings and, more particularly, to Figs. 1 to 5, the portable intercommunication apparatus in accordance with the invention is enclosed in a rectangular casing 10 having a hinged cover 11 provided with a suitable handle for carrying the casing. The apparatus comprises two handsets 12 and 13, each provided with the usual transmitter and receiver elements. Mounted on the yoke handle of handsets 12 and 13 are push button switches 14 and 15, respectively. One holding the handset and speaking into the mouthpiece may depress the push button with a finger of his hand to establish a connection between the two handsets.

Handset 12 is connected to the end of a four-wire cable 16 which is coiled about a reel 17 having spaced end plates 17′ and 17″. The reel is supported on a shaft 18 rotatably mounted between two spaced upright bearings 19 and 20, a handle 21 being secured to one end of the shaft for turning the reel in order to play out or rewind the cable thereon.

The other end of the four-wire cable 16 terminates in slip-ring elements 22 and 23, each having a pair of contacts mounted on shaft 18 adjacent either end of the reel, two wires 44 and 45 of the cable being connected to the contacts of one of the elements and the remaining two wires 46 and 47 being connected to the contacts of the other element. Wires 44 and 45 extend into the reel through an opening in end plate 17′, and wires 46 and 47 extend therein through an opening in end plate 17″.

The other handset 13 is connected by a four-wire cable 24 to a terminal box 25 mounted on the floor of casing 10, connections from the terminal box extending to a battery 26 and to brushes mounted on bearings 19 and 20, the brushes engaging the slip-ring elements 22 and 23. The details of the brushes and the slip-rings will be later described. Battery 26 is removably secured to casing 10 by means of a flexible clamp 37.

Figure 3:
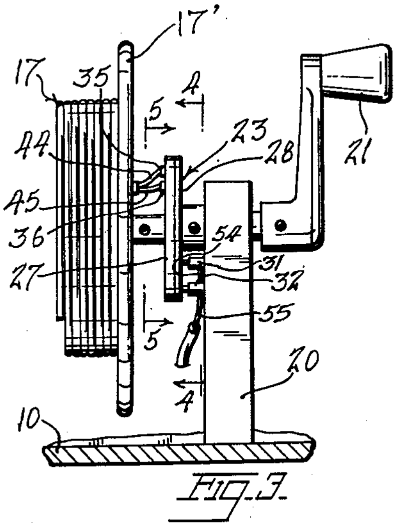
Fig. 3 is an enlarged detail of Fig. 2.
Figure 4:
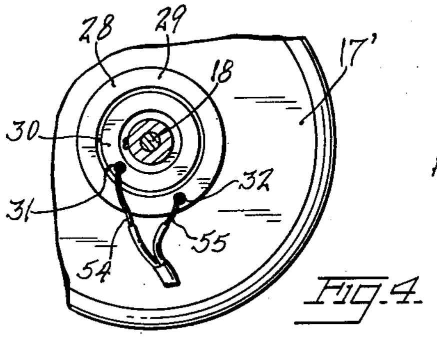
Fig. 4 is a view taken along lines 4—4 in Fig. 3.

As best seen in Fig. 3, each slip-ring element is constituted by an insulating disc 27 and a contact disc 28 attached thereto. The contact disc 28, as shown separately in Fig. 4, is constituted by two concentric and electrically separated metal rings 29 and 30, the rings being frictionally engaged by brushes 31 and 32, respectively, which are fixedly mounted on bearing 20. Soldered to brushes 31 and 32 are wires 54 and 55, which wires are extended to terminal box 25.

Figure 5:
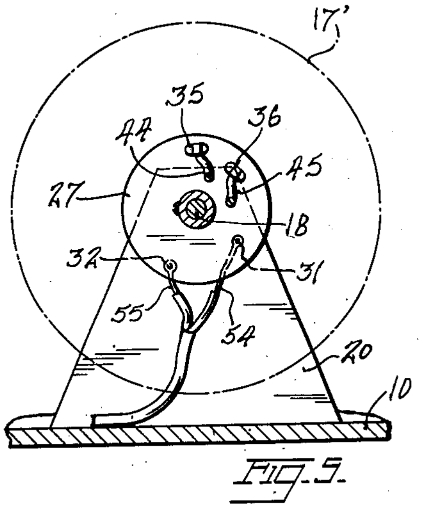
Fig. 5 is a view taken along lines 5—5 in Fig. 3.

Mounted on the insulating disc 27, as shown in Fig. 5, are terminals 35 and 36, which connect with rings 29 and 30, respectively, these terminals being connected to the wires 44 and 45 of cable 16. Thus connections are established between cable wires 44 and 45 and the wires 54 and 55 leading to terminal box 25. In a similar manner, connections are established between cable wires 46 and 47 and the wires 52 and 53 leading to the terminal box 25.

In practice, as the reel is rotated to uncoil the cable, an unbroken electrical connection is maintained via the slip-rings and brushes between the four wires in the cable 16 and the leads going to terminal box 25.

Figure 6:
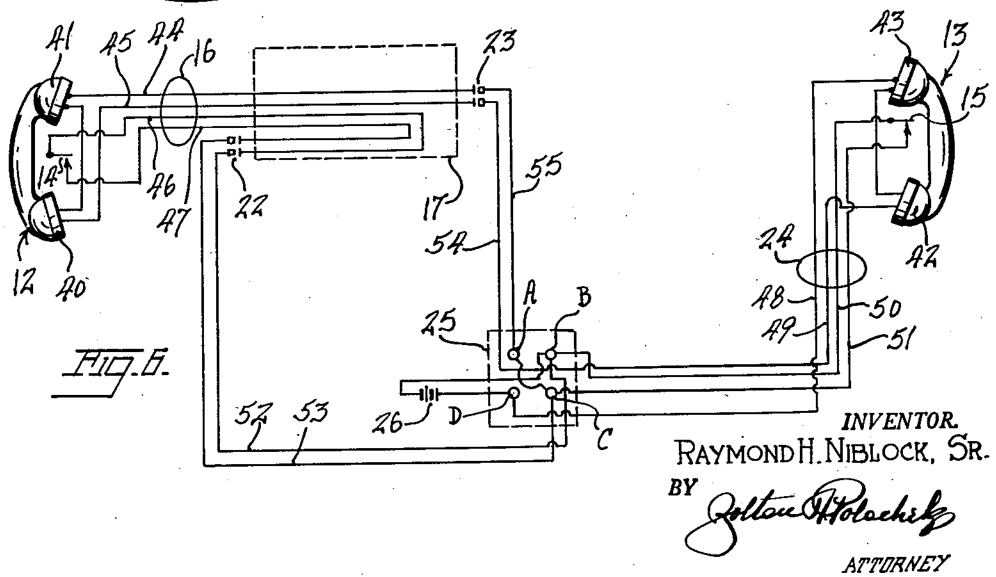
Fig. 6 is a schematic diagram of the intercommunication apparatus.

The electrical connections of the intercommunication apparatus are best seen in Fig. 6, wherein the structural elements disclosed in Figs. 1 to 5 are represented schematically, like components being represented by like reference numerals. The telephone handset 12 is provided with a transmitter 40 and a receiver 41; handset 13 being similarly provided with a transmitter 42 and a receiver 43. Transmitter 40 and receiver 41 are connected in series to the two wires 44 and 45 of the four-wire cable 16, the remaining two wires 46 and 47 being connected to switch 14 on the handset 12. The cable 16 is wound about reel 17, the wires 44 and 45 therein terminating in the contacts of the slip-ring 23 on one side of the reel, the wires 46 and 47 terminating in the contacts of slip-ring 22 on the other side of the reel.

The transmitter 42 and receiver 43 of handset 13 are serially connected to two wires 48 and 49 of the four-wire cable 24, switch 15 being connected to the remaining wires 50 and 51. Wires 50 and 51 of cable 24 are connected to terminls B and C of the terminal box 25, and wires 46 and 47 of cable 16 are connected to the same terminals via connections 52 and 53 from slip-ring 22. Thus, switches 14 and 15 are connected in shunt relation, and the operation of either switch activates the system.

Wire 45 of cable 16 is connected via one contact of slip-ring 23 and wire 54 to wire 49 of cable 24, whereas wire 44 of cable 16 is connected via the other contact of slip-ring 23 and wire 55 to terminal A, which in turn is connected to terminal C. Battery 26 is connected between terminals B and D, wire 48 being connected to terminal D.

Figure 7:
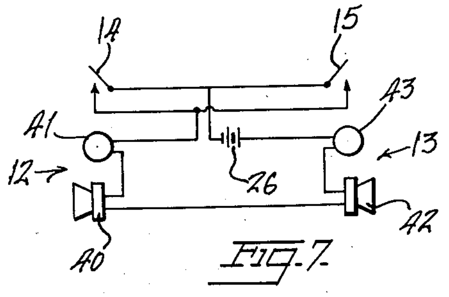
Fig. 7 is a simplified schematic diagram of said apparatus.

The overall circuit arrangement, as shown by the simplified schematic diagram in Fig. 7, is such that the serially connected transmitter and receiver 40 and 41 are connected via the shunt connected switches 14 and 15 in series with battery 26 to the serially connected transmitter and receiver 42 and 43. Operation of either of switches 14 or 15 will complete the current path between the two handsets and render the system operative. In practice, the casing 10 carrying the apparatus is placed at one station, and the handset 12 connected to cable 16 is carried to the other station, the cable, as the handset is carried, being unwound in one direction from reel 17 to the extent determined by the distance between stations. An operator at either point may communicate with the other point by pressing the switch on the handset. When use of the apparatus is no longer necessary, the cable is wound back on the reel by turning the handle in the reverse direction, and the two handsets are returned to the casing. If preferred, suitable cradles may be set up in the casing to support the handsets when not in use. Inasmuch as the system can be activated only by pressing a push button on one of the handsets, there is no possibility of the system being operative when not in use. Hence, inadvertent draining of the battery current is avoided.

While handsets have been shown, it is to be understood that a headset may be used in lieu thereof. For this purpose, the cables 16 and 24 may be terminated in cable connectors, adapted for coupling to either a headset or a handset.

It is also to be noted that when either of switches 14 and 15 is actuated, a loud distinct click is audible in receivers 41 and 43 of the respective handsets 12 and 13. These clicks may be clearly heard for some distance away from the receivers. Consequently to signal, the person at the calling station has merely to actuate his handset switch several times in succession to call the other station to attention. These signalling clicks may also be used to transmit coded messages, the code signals being tapped out on the switches. Thus the switches serve not only to set the telephone system into operation but also act to provide click signals in the system.

While I have illustrated and described the preferred embodiment of my invention, it is to be understood that I do not limit myself to the precise construction herein disclosed and the right is reserved to all changes and modifications coming within the scope of the invention as defined in the appended claims.

Having thus described my invention, what I claim as new and desire to secure by United States Letters Patent is:

1. In an inter-communication device for use with a portable telephone apparatus comprising two handsets each including a receiver, a transmitter and an operating switch, a rotatably mounted reel structure, a cable coiled upon said reel and having four conductors, one end of said cable being connected to one of said handsets, slip-rings having four contacts attached to said reel structure for rotation therewith, the other end of said cable conductors being terminated in the contacts of said slip-rings, fixedly mounted brushes engaging said slip-rings, and circuit means including a battery connected to said brushes for establishing a connection between the other handset and said one handset, when one of said switches is closed.

2. In an inter-communication device for use with a portable telephone apparatus comprising two handsets each including a transmitter, a receiver connected in series therewith and a switch, a rotatably mounted reel structure, a four-wire cable coiled upon said reel, one pair of said wires at one end of said cable being connected to the series connected transmitter and receiver of one handset, the other pair of wires being connected to said switch of said one handset, a slip-ring having a pair of contacts attached at either end of said reel structure for rotation therewith, one pair of wires at the other end of the cable being terminated in one pair of slip-ring contacts, the other pair of wires being terminated in the other pair of slip-ring contacts, a pair of brushes fixedly mounted adjacent either end of said reel structure to engage a respective pair of slip-ring contacts, and circuit means connected to said brushes for establishing a connection between the other handset and said one handset.

3. In an inter-communication device for use with a portable telephone apparatus comprising two handsets each including a transmitter, a receiver connected in series therewith and an operating switch, a rotatably mounted reel structure, a four-wire cable coiled upon said reel, one pair of said wires at one end of said cable being connected to the series connected transmitter and receiver of one handset, the other pair being connected to said switch of said one handset, a slip-ring having a pair of contacts attached at either end of said reel structure for rotation therewith, one pair of wires at the other end of the cable being terminated in one pair of contacts, the other pair of wires being terminated in the other pair of contacts, a pair of brushes fixedly mounted adjacent either end of said reel structure to engage a respective pair of slip-ring contacts, and circuit means connected to said brushes for establishing a connection between the other handset and said one handset, said circuit means including a battery and a terminal box for connecting said battery in series with said handsets when one of said switches is closed.

4. In an inter-communication device for use with a portable telephone apparatus comprising two handsets each including a transmitter, a receiver connected in series therewith and a switch, a reel, a pair of spaced bearings for rotatably mounting said reel, a four-wire cable coiled upon said reel, one pair of wires at one end of said cable being connected to said serially connected transmitter and receiver, the other pair being connected to said switch, a slip-ring having a pair of ring contacts attached at either end of said reel for rotation therewith, one pair of wires at the other end of the coiled cable being connected to one pair of ring contacts, the other pair of wires being connected to the other pair of ring contacts, and a pair of brushes fixedly mounted on each bearing to engage the associated pair of ring contacts.

5. In an inter-communication device for use with a portable telephone apparatus comprising two handsets each including a transmitter, a receiver connected in series therewith and a switch, a reel, a pair of spaced bearings for rotatably mounting said reel, a four-wire cable coiled upon said reel, one pair of wires at one end of said cable being connected to said serially connected transmitter and receiver, the other pair being connected to said switch, a slipring having a pair of ring contacts attached at either end of said reel for rotation therewith, one pair of wires at the other end of the coiled cable being connected to one pair of ring contacts, the other pair of wires being connected to the other pair of ring contacts, a pair of brushes fixedly mounted on each bearing to engage the associated pair of ring contacts, and circuit means including a voltage source connected to said brushes for establishing a connection between the other handset and said one handset.

6. In an inter-communication device for use with a portable telephone apparatus comprising two handsets each including a transmitter, a receiver connected in series therewith and a switch, a reel, a pair of spaced bearings for rotatably mounting said reel, a four-wire cable coiled upon said reel, one pair of wires at one end of said cable being connected to said serially connected transmitter and receiver, the other pair being connected to said switch, a slipring having a pair of ring contacts attached at either end of said reel for rotation therewith, one pair of wires at the other end of the coiled cable being connected to one pair of ring contacts, the other pair of wires being connected to the other pair of ring contacts, a pair of brushes fixedly mounted on each bearing to engage the associated pair of ring contacts, and circuit means including a voltage source connected to said brushes for establishing a connection between the other handset and said one handset, said circuit means including a terminal box connecting said source in series with the handset circuits when either one of said switches is closed.

7. In an inter-communication device for use with a portable telephone apparatus comprising two handsets each including a transmitter, a receiver connected in series therewith, a yoke for supporting said transmitter and receiver, and a switch mounted on said yoke, a reel, a pair of spaced bearings for rotatably mounting said reel, a four-wire cable coiled upon said reel, one pair of wires at one end of said cable being connected to said serially connected transmitter and receiver, the other pair being connected to said switch, a slip-ring having a pair of ring contacts attached at either end of said reel for rotation therewith, one pair of wires at the other end of the coiled cable being connected to one pair of ring contacts, the other pair of wires being connected to the other pair of ring contacts, a pair of brushes fixedly mounted on each bearing to engage the associated pair of ring contacts, and circuit means including a voltage source connected to said brushes for establishing a connection between the other handset and said one handset.

8. A portable telephone apparatus as set forth in claim 7, including a casing having a hinged cover, said reel and said source being mounted in said casing, and further including cradles to support said handsets.

References Cited in the file of this patent

UNITED STATES PATENTS

| | | |
|---|---|---|
| 319,043 | Waite | June 2, 1885 |
| 858,611 | Lovett | July 2, 1907 |